(12) United States Patent
Crisostomo (10) Patent No.: US 12,460,847 B2
(45) Date of Patent: Nov. 4, 2025

(54) ON-DEMAND AIR BLEEDING METHOD FOR REFRIGERATION SYSTEMS, AND SYSTEM FOR IMPLEMENTING SAID METHOD

(71) Applicant: HANTECH BRASIL COMERCIAL IMPORTADORA E EXPORTADORA LTDA, Itaquaquecetuba (BR)

(72) Inventor: Luciano Lombardi Crisostomo, São Paulo (BR)

(73) Assignee: HANTECH BRASIL COMERCIAL IMPORTADORA E EXPORTADORA LTDA, Itaquaquecetuba (BR)

( * ) Notice: Subject to any disclaimer, the term of this patent is extended or adjusted under 35 U.S.C. 154(b) by 28 days.

(21) Appl. No.: 18/572,356

(22) PCT Filed: Aug. 25, 2021

(86) PCT No.: PCT/BR2021/050362
§ 371 (c)(1),
(2) Date: Dec. 20, 2023

(87) PCT Pub. No.: WO2023/272365
PCT Pub. Date: Jan. 5, 2023

(65) Prior Publication Data
US 2024/0288207 A1    Aug. 29, 2024

(30) Foreign Application Priority Data
Jul. 2, 2021  (BR) .......................... 102021013199-3

(51) Int. Cl.
*F25B 43/04*    (2006.01)
*F25B 41/20*    (2021.01)

(52) U.S. Cl.
CPC ............ *F25B 43/043* (2013.01); *F25B 41/20* (2021.01); *F25B 2600/2519* (2013.01); *F25B 2700/04* (2013.01)

(58) Field of Classification Search
CPC .......... F25B 2700/04; F25B 2600/2519; F25B 41/20; F25B 43/043; F25B 43/04
See application file for complete search history.

(56) References Cited

U.S. PATENT DOCUMENTS

| | | | |
|---|---|---|---|
| 3,081,605 | A | 3/1963 | Leonard, Jr. |
| 4,476,688 | A | 10/1984 | Goddard |
| (Continued) | | | |

FOREIGN PATENT DOCUMENTS

| | | |
|---|---|---|
| BR | 9102444 A | 1/1992 |
| BR | 112013032198 A2 | 12/2016 |
| (Continued) | | |

OTHER PUBLICATIONS

International Search Report for PCT/BR2021/050362 mailed on Mar. 22, 2022.

*Primary Examiner* — Cassey D Bauer
(74) *Attorney, Agent, or Firm* — Schmeiser, Olsen & Watts LLP (57) ABSTRACT

An on-demand air bleeding method is provided in which the refrigeration plant valve is opened until all of the non-condensable gases have been withdrawn from the bleed point, the system switches to receiving refrigerant fluid in the fluid state, which is conveyed to the high-pressure tank; and when the increase in the level of the tank is detected, the first refrigeration plant valve is closed and a second refrigeration plant valve is opened and begins collecting air from a new point in the system, and when the pressure in the tank reaches a threshold value, an air valve is actuated and the non-condensable gases are expelled from the tank to a bubbler; and when the level of fluid reaches a threshold, a (Continued)

feedback valve is actuated and the fluid is returned to the system until the fluid level in the tank returns to an initial value.

13 Claims, 8 Drawing Sheets

(56) References Cited

U.S. PATENT DOCUMENTS

| | | |
|---|---|---|
| 5,501,082 A | 3/1996 | Tachibana |
| 6,510,698 B2 | 1/2003 | Kasai et al. |
| 6,705,100 B2 | 3/2004 | Heiden et al. |
| 7,174,742 B2 | 2/2007 | Thomas et al. |
| 2013/0028830 A1 | 1/2013 | Kazimiers |
| 2017/0307269 A1* | 10/2017 | Gu .................... F25B 43/003 |

FOREIGN PATENT DOCUMENTS

| | | |
|---|---|---|
| BR | 112014027189 A2 | 6/2017 |
| EP | 2861920 B1 | 2/2021 |

* cited by examiner

ON-DEMAND AIR BLEEDING METHOD FOR REFRIGERATION SYSTEMS, AND SYSTEM FOR IMPLEMENTING SAID METHOD

CROSS-REFERENCE TO RELATED APPLICATIONS

This application claims priority to PCT Application No. PCT/BR2021/050362, having a filing date of Aug. 25, 2021, which is based on Brazilian application Ser. No. 10/202, 1013199-3, having a filing date of Jul. 2, 2021, the entire contents both of which are hereby incorporated by reference.

FIELD OF TECHNOLOGY

The following belongs to the technological sector of Mechanics (thermal machines) and refers to an air bleeding method with variable bleed point according to the concentration of non-condensable gases.

Furthermore, the following relates to an automated system for implementing the method.

BACKGROUND

In a refrigeration system, the expansion and condensation of a refrigerant fluid is a vital part of its working principle. Thus, a refrigeration system is the efficient use of transfer phenomena and thermodynamics so that the refrigerant fluid expands, absorbing heat from the environment to be cooled and condenses in a second environment, releasing heat away from the environment of interest. This process should ideally take place in a sealed system so that non-condensable gases cannot enter the system.

The basic principle described has been used for a long time and, as a result, new technologies are being developed to improve the system, increasing its efficiency and durability. One of these improvements is the air bleeding system that aims to eliminate atmospheric air and other non-condensable gases that mix with system refrigerant can decrease efficiency, increase energy costs and destroy equipment.

The process of withdrawing air is called bleeding. This bleeding process became more and more automatic over time. Try as you might, air will enter the system and collect on the inside surface of the heat exchanger, creating an insulating barrier. Whether the suction-side pressure is above or below atmospheric, air can collect in refrigeration systems in one or more ways:

1. Refrigerant, when delivered, may contain up to 1.5% non-condensables.
2. System evacuation is inadequate before charging with refrigerant.
3. When opening the system to repair equipment, such as a compressor, air accumulates.
4. Breakdown of refrigerant or lubricating oils or both occurs.
5. Leaks occur in the system that allow air to migrate into the system through gasket and valve seals, especially when the suction pressure is below atmospheric.

In this reality, automatic air bleeding systems are some of the alternatives found to solve these problems. In this sense, some solutions and technologies have already been developed to solve these inconveniences.

Document BR 11 2014 027189-5 describes a refrigeration system with an air bleed valve. The air bleeding system is configured to withdraw one or more non-condensable gases from the chiller refrigerant, the air bleed valve additionally including an outlet for returning the chiller refrigerant to the refrigeration system, and an acid filter connected in fluid communication with the air bleed valve and configured to withdraw one or more acids from the refrigerant. However, this system bleeds at fixed time intervals.

Document PI 9102444 describes an air bleeding system for refrigerant condensates with a float valve and condenser. This type of system is subject to hysteresis effects, caused by the imprecise movement of the internal float. Furthermore, the air bleed is closed when a certain level is reached.

Document U.S. Pat. No. 5,501,082 describes a method for transferring refrigerant charged in a refrigerator to a refrigerant tank, provided separately from the refrigerator, without releasing the refrigerant to the atmosphere, and a suitable apparatus for carrying out the method, as well as a method for bleeding to the atmosphere non-condensable gases.

As can be seen, there are a large number of air bleeding systems in the state of the conventional art. However, these systems have timers on their solenoid valves, instead of adapting according to the dynamism of the system, presenting the following consequence: the bleed time will never be ideal;

(i) if the time is too short, the solenoid closes, the system switches to the subsequent solenoid without the guarantee that air from that collection point has been withdrawn every day,
(ii) if the time is too long, the air from the collection point ends, with the solenoid still open, which starts to withdraw fluid refrigerant.

This fact causes a large increase in volume and pressure in the discharge vessel. This increase in pressure has catastrophic potential and it is necessary to use safety check valves in bypass that opens the passage releasing suction and the low-pressure system is under pressure, fluid and also the collected air, which returns to the system.

Therefore, there is unnecessary energy expenditure and work loss, resulting in lower efficiency.

Furthermore, state-of-the-conventional art systems use suboptimal heat exchangers, generally being of the shell type with coil.

Therefore, there is no high-efficiency process with air bleed on demand and heat exchangers with high thermal efficiency.

To solve these problems, embodiments of the present invention provide a method and system for air bleeding on demand in which the valve is not controlled by a timer but by level sensors in the low pressure tank which is actuated when the system begins to collect refrigerant fluid and the level in the tank increases, ensuring that the valve remains open for as long as necessary for air to escape without exceeding and expelling refrigerant from the system.

It is also proposed to use a stainless-steel parallel plate heat exchanger, with much smaller dimensions, more efficient, more durable.

Therefore, there is no equivalent solution in the state of the conventional art to that presented here in embodiments of the present invention, which combines technical features, economic advantages and unprecedented efficiency.

SUMMARY

An aspect related to a solution to the challenges and limitations listed above, presenting a method for bleeding non-condensable gases on demand automatically, in which the bleed point adapts to variations caused by the dynamic behavior of the transport system.

It is an aspect of embodiments of the present invention to provide an air bleeding method that increases the efficiency and cooling capacity of the system.

It is also an aspect of embodiments of the present invention to provide a method with minimal elimination of refrigerant fluid in the most dynamic bleeding process, with a bleeding solution always ideal for the state/condition of the system.

It is a further aspect of embodiments of the present invention to provide a method with a wide operating temperature range.

It is a further aspect of embodiments of the present invention to provide an automatic system that implements an on-demand air bleeding method, with a variable bleed point.

It is also an aspect of embodiments of the present invention to provide a system with constructive improvements that increases the efficiency of heat exchanges that occur in the system.

It is also an aspect of embodiments of the present invention to provide a system with less refrigerant fluid elimination in the bleeding process.

It is also an aspect of embodiments of the present invention to provide a system with greater range and operation and, therefore, a greater field of application, in a greater number of industries.

It is also an aspect of embodiments of the present invention to provide a system that requires less time to reach the optimal condition of the system.

Embodiments of the present invention achieve these and other objectives through an air bleeding method for refrigeration systems that comprises the following steps:
- receive condensed fluid from a refrigeration system;
- conduct the condensed fluid through a heat exchanger, in order to cool it;
- return the condensed fluid from the exchanger to the refrigeration system;
- collect the mixture of non-condensable gases and refrigerant fluid in a gaseous state, coming from a chosen bleed point of the refrigeration system, through the opening of a first plant valve at a first point and lead it to the cooled heat exchanger;
- condensation of the mixture in the heat exchanger, until the refrigerant fluid remains in a fluid state at high pressure;
- conduction of the mixture of fluid refrigerant and non-condensable gases at high pressure coming from the plant to a high pressure tank;
- monitor the fluid level in the tank and the pressure in the tank;
- conduction of non-condensable gases withdrawn from the high-pressure tank to a bubbler by pressure difference through the opening of an air valve;
- conduction of bubbles and droplets of condensed refrigerant fluid from the tank to the refrigeration system by gravity, through the opening of a feedback valve; It is
- expulsion of non-condensable gases in the bubbler;

wherein the plant valve remains open until all incondensable gases are withdrawn from that bleed point, and when there is no more air to be bled, the system starts to receive fluid refrigerant fluid, which is conducted to the high pressure tank, increasing the tank level; and when an increase in the tank level is detected, the first plant valve closes and a second plant valve opens, collecting air from a new point in the system, and when the pressure in the tank reaches a threshold value, an air valve is actuated and the non-condensable gases are expelled from the tank to a bubbler; and when the fluid level reaches a threshold, a feedback valve is actuated and fluid is returned to the system until the fluid level in the tank returns to an initial value.

Furthermore, embodiments of the invention achieve these and other objectives by a device for employing the method.

BRIEF DESCRIPTION

Some of the embodiments will be described in detail, with references to the following Figures, wherein like designations denote like members, wherein.

DETAILED DESCRIPTION

Embodiments of the present invention relate to an on-demand air bleeding system. Embodiments of the present invention use an innovative method in which the bleed point is variable, to ensure that all air is withdrawn from the system, and that refrigerant fluid is not withdrawn during bleeding.

The system of embodiments of the present invention uses components already available on the market, such as sensors, valves, heat exchangers, etc., facilitating its development and implementation, but which have never been used in this way for air bleeding systems.

It should be noted that, as already demonstrated, the state of the conventional art does not offer a solution equivalent to embodiments of the invention described herein. This is because the automation solutions used are based on an old bleeding method, wherein a timer based on a fixed bleed point is used, which results in the valve remaining open for a time below the ideal, leaving air in the system, or the valve remaining open for a time above the ideal, causing expulsion of refrigerant fluid from the system.

Embodiments of the present invention present numerous technical and economic advantages when compared to the state of the conventional art, some of which are listed below:
  System with parallel plate heat exchanger instead of coil, more efficient, more durable;
  Air bleeding system on demand, controlling the air opening time at the bleed point no longer by a timer, but on demand or need to withdraw air at that point;
  Feedback system in conjunction with the level control system, controls the air withdraw demands, as well as the reuse of the refrigerant fluid condensed and separated from the air;
    Furthermore, the unprecedented use of a parallel plate heat exchanger increases efficiency by 35% in startup conditions since, as the volume of fluid in the exchanger is much smaller than a shell and coil exchanger, the starting delay and time required to reach working condition is much shorter. Furthermore, the parallel plate heat exchanger is 55% more efficient after 1 year, due to reduced oxidation and contact surface;
    It is possible to obtain the same efficiency as conventional air bleed valves with just 10% of the refrigerant fluid volume, being safer and cheaper;
    Intelligent control system, which, through its pressure transducers and PT1000 temperature transmitters, analyzes the operating dynamics of the equipment, and automatically identifies the working condition;
    Longer service life of the exchangers due to their stainless-steel manufacturing.

The system provides new applications for air bleed valves in refrigeration systems with temperature ranges above 0° C.)

Figure 1:
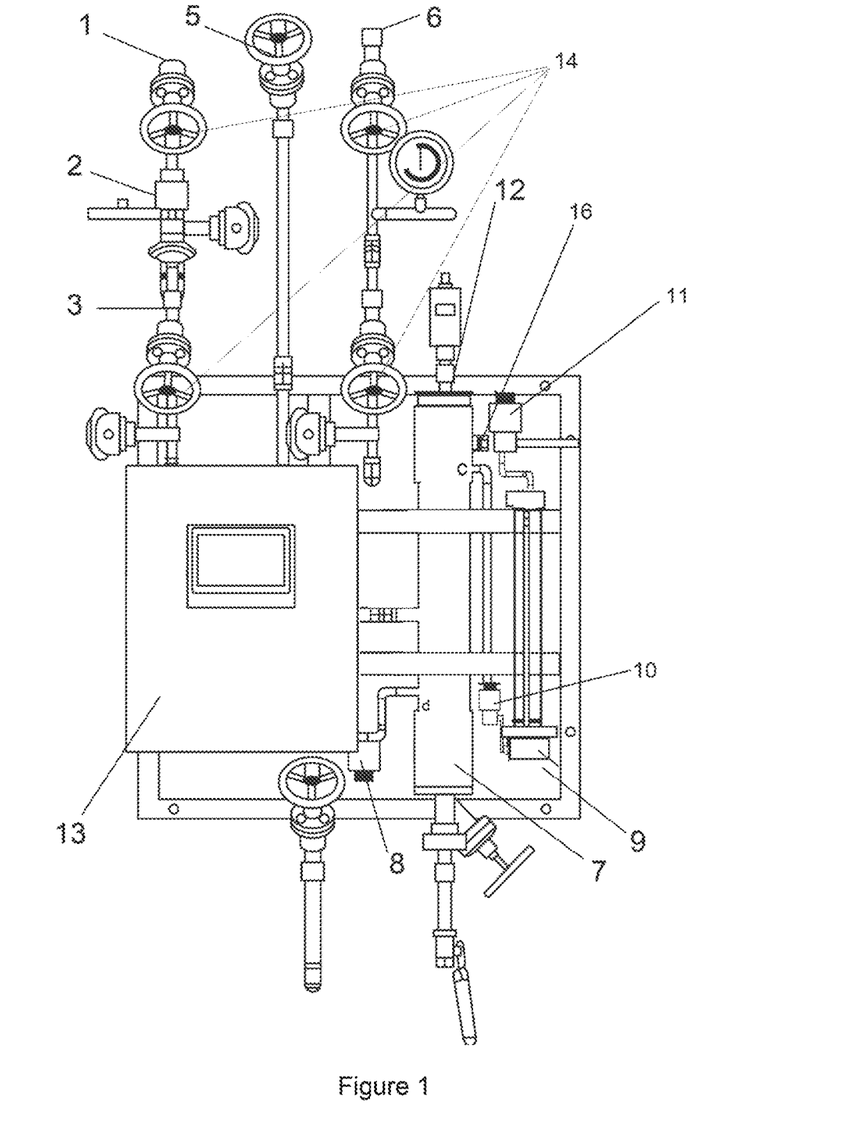
FIG. 1 represents the front view of the system object of embodiments of the present invention.

Referring to FIG. 1, the bleeding system (S) comprises a fluid inlet 01 that receives the fluid from the refrigeration system reservoir at pressure and condensation temperature, coming from the external system. The fluid inlet 01 is connected to a fluid line solenoid valve 02 followed by an expansion valve 03. The expansion valve 03 is connected to the inlet (a) of a heat exchanger 04. In an embodiment, the heat exchanger 04 is a parallel plate heat exchanger, but variations where the heat exchanger is of the shell/coil type are envisaged.

Additionally, the exchanger may have a heat exchange surface with an area of 0.4 m² to 0.8 m².

Figure 2:
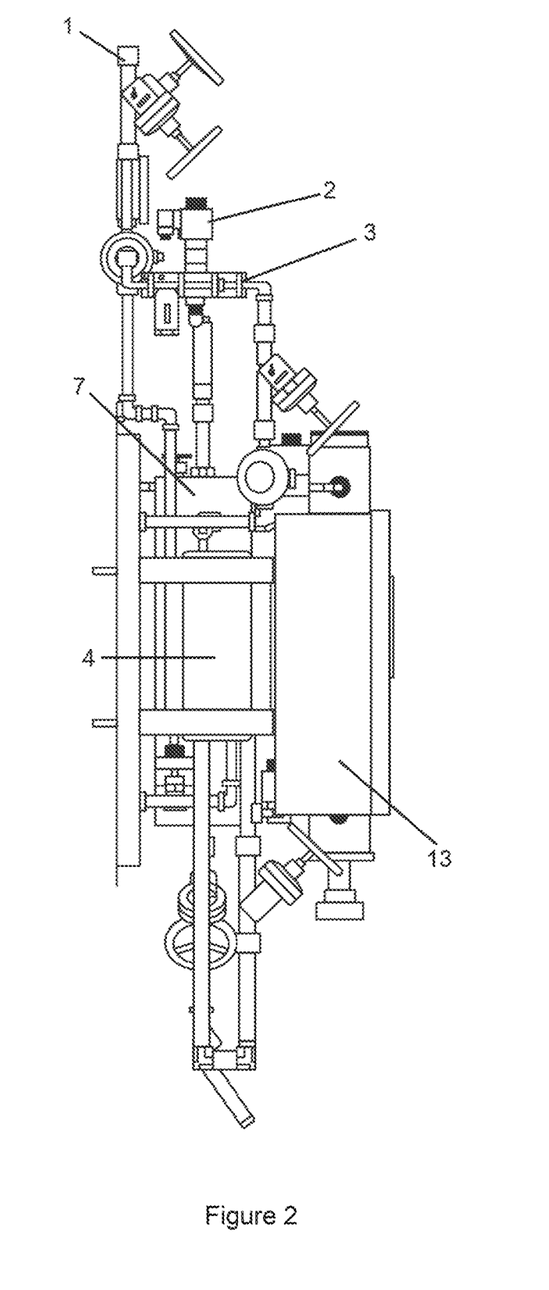
FIG. 2 represents the side view of the system object of embodiments of the present invention in, showing the heat exchanger behind the panel.

The exit (a) of the heat exchanger 04 leads to the exit of fluid (5) condensed at low pressure, as referenced in FIG. 2.

The bleeding system (S) has external bleed valves, installed in the refrigeration system piping, from which it is desired to bleed air, using the bleeding system, object of embodiments of the present invention.

Thus, the air bleeding system (S) also comprises an air inlet (6), which receives the air collected by the external solenoids, installed in the industrial refrigeration system. Air inlet 06 is connected to inlet (b) heat exchanger 04, so that heat exchange occurs between the fluid that enters through the mixing inlet 01 and the air that enters through the air inlet 06. At outlet 4b'' heat exchanger 04 is connected to a high-pressure tank 07.

Figure 3:
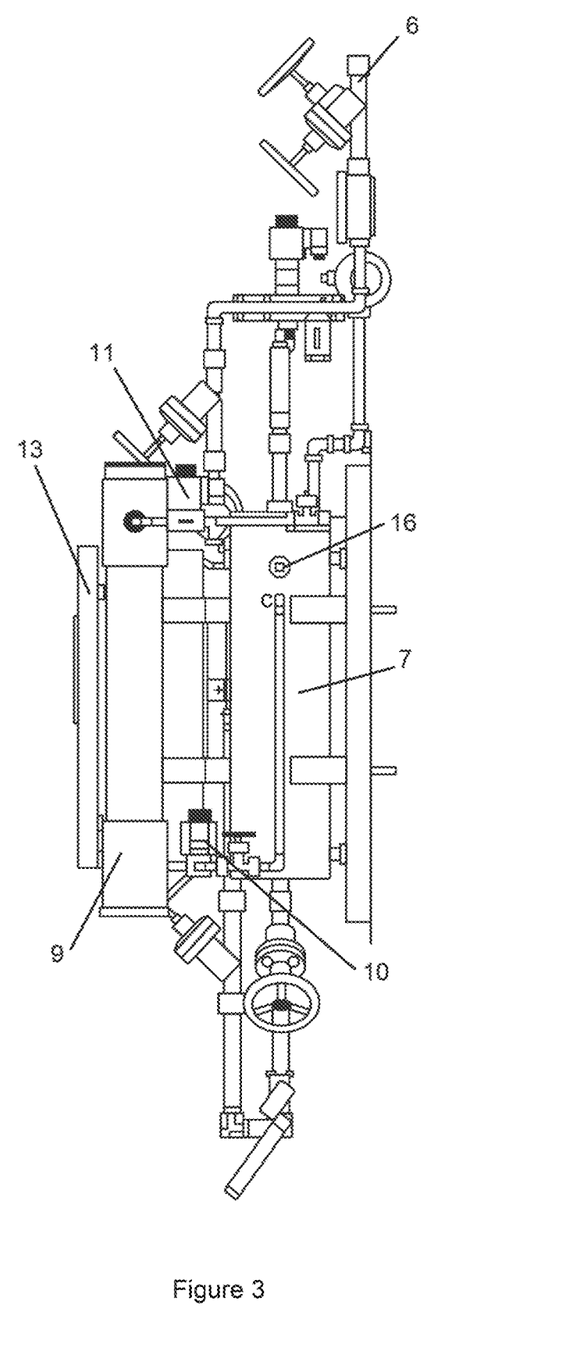
FIG. 3 represents the side view of the system object of embodiments of the present invention, showing the tank connections with the bubbler and the water inlet to the bubbler.

Referring to FIG. 3, the high-pressure tank 07 comprises a feedback outlet 07c and an air outlet 07d. The feedback output 07c is connected to a feedback valve 08, which leads to the heat exchanger input 04a'. The air outlet 07d is connected to a bubbler 09, with a solenoid valve 10 between them. Furthermore, the tank 07 comprises a level gauge 12, a capacitive dipstick.

The bubbler 09 is connected to a water solenoid valve 11, which opens and closes a water inlet, which can be the plant's tap water source.

Additionally, the heat exchange area of the exchanger (4) may vary depending on the desired capacity.

The system (S) further comprises a control panel 13 10, which comprises a programmable logic circuit, which will control both the solenoid valves of the bleeding system (2, 8, 10 and 11) and the external valves installed in the refrigeration system. Panel 13 further comprises electronic components for adjusting logic circuit impedances for electrical signals to the controlled valves.

Additionally, the panel may also comprise a display for displaying information and to aid operation.

In relation to the location of the external valves, non-condensable gases stuck in the industrial refrigeration system piping tend to migrate to the highest point of the system, in this case the entrance to the condensers. This is the best point to withdraw this air from the circuit, when the system is stopped. With the system in operation, the refrigerant fluid is at high speed at the entrance to the condensers, and in superheated vapor condition, making it difficult to withdraw air at this point, since it is mixed with the refrigerant in a gaseous state. With the system running, the best point to withdraw air from the system is at the condenser outlet, as refrigerant fluid condenses at low speed at this point, and in a cross-section of the pipe, the fluid will occupy part of the volume, and in the upper part of the pipe there will be non-condensable gases, being the ideal location for the external solenoids, which collect the air. Normally during the day, and in summer, the condenser outlets are the points where air is most easily found to be withdrawn. At night, in winter or colder seasons, a large amount is deposited in the fluid reservoir at the top of the vessel and, therefore, it is necessary to have a bleed point solenoid valve in this location as well.

Therefore, the location of the external solenoid valves varies from one refrigeration system to another, being determined in the design of the bleeding system according to the properties of that particular plant. Thus, the control programming for the valves is designed according to the location of the external valves in the plant adopted in the project, being a Taylormade construction.

Device Operation

Figure 4:
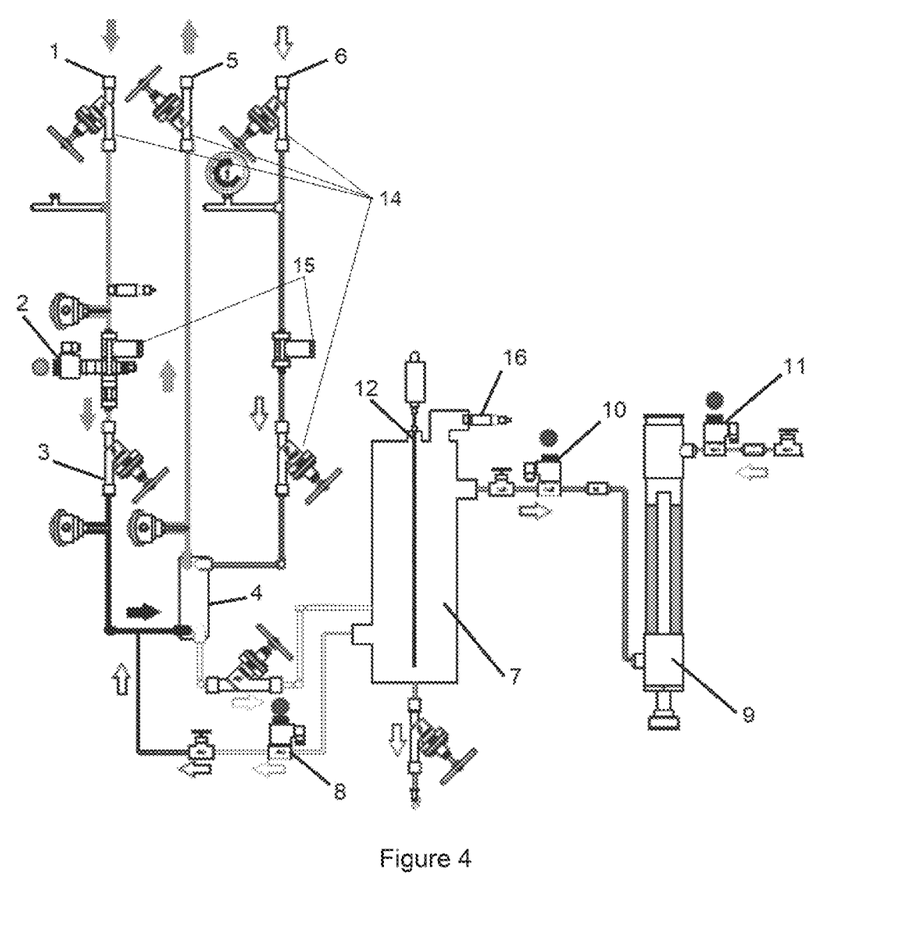
FIG. 4 represents a diagram of the flow in the pipes in initiation operation, where the open solenoids are marked with a light dot and the closed ones with a dark dot and the filled arrows mean that there is fluid flow, while the open arrows represent that the flow is interrupted at that point.

The S bleeding system operates in four main cycles. Referring to FIG. 4, a step of filling the bubbler 09 occurs with the opening of the water valve 11, which receives water from the plant and fills the bubbler 09.

Figure 5:
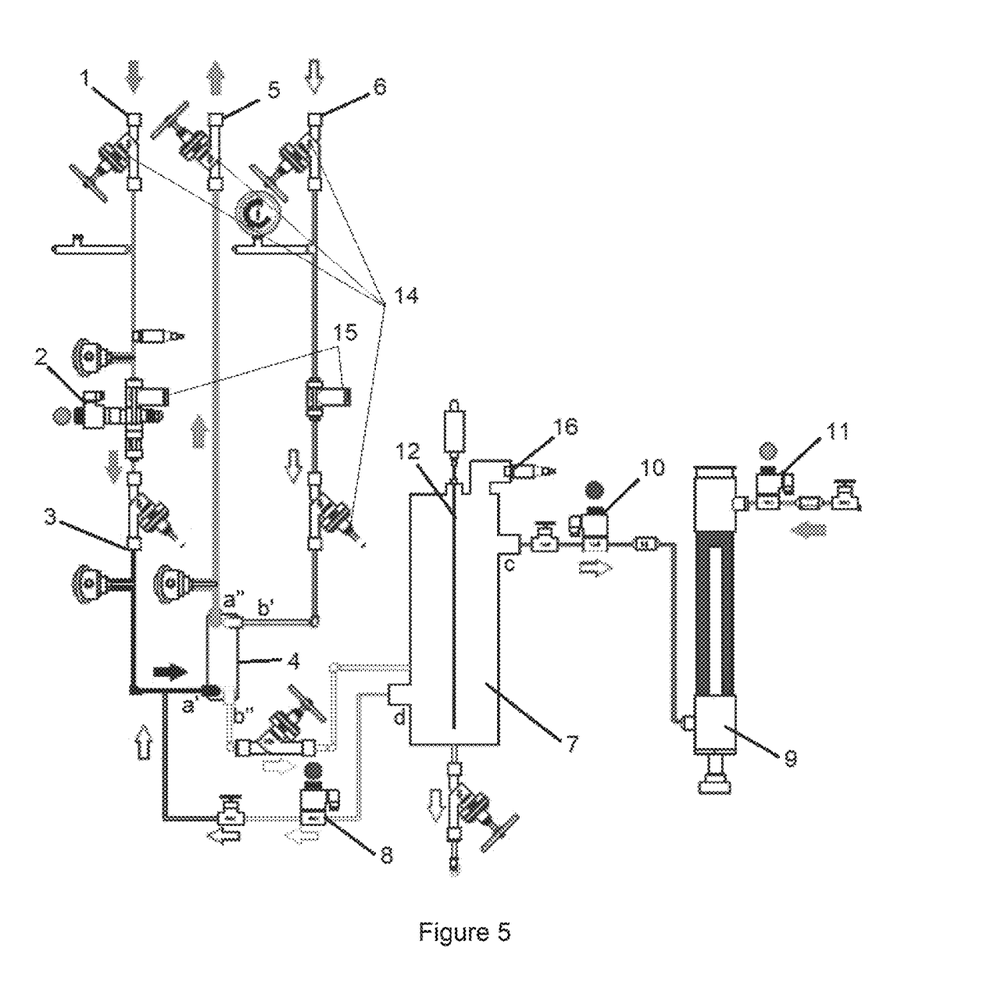
FIG. 5 represents a diagram of the flow in the pipes during heat exchanger cooling operation, in an initial stage, where the open solenoids are marked with a light dot and the closed ones with a dark dot and the filled arrows mean that there is flow of fluid, while the open arrows represent that the flow is interrupted at that point.

Still at an initial stage, the fluid line valve 02 of the fluid inlet 01 is opened, so that the fluid passes through the expansion valve 03, reducing the pressure and temperature of the fluid to the evaporation condition, passing through inlet 04a' of heat exchanger 04 and cooling it. The condensed fluid is returned to the external system through the fluid outlet (5). The valves are opened automatically by the controller, and the system is ready to operate, as shown in FIG. 5.

Figure 6:
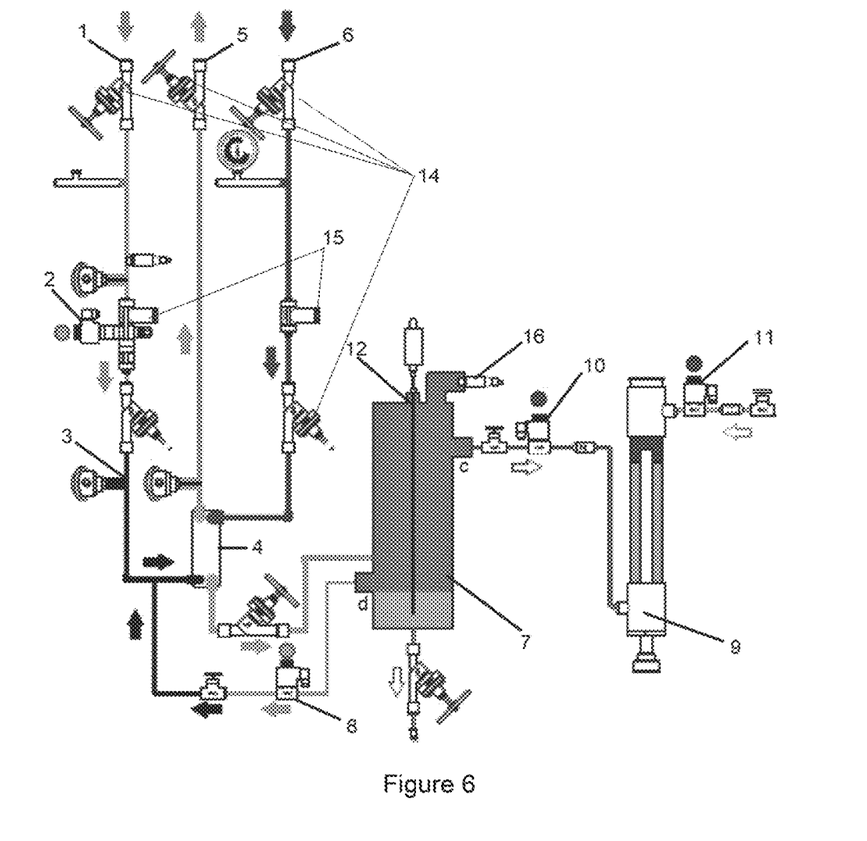
FIG. 6 represents a diagram of the flow in the pipes in air collection operation from the plant's bleed points, where the open solenoids are marked with a light dot and the closed ones with a dark dot and the filled arrows mean that there is fluid flow, while the open arrows represent that the flow is interrupted at that point.

In reference to FIG. 6, an air collection cycle takes place through external valves, connected at desired and strategic points in the cooling system. At a certain bleed point, the external valve is opened by the controller so that the air from that point is withdrawn from the plant and taken to the system's air inlet (S). The non-condensable air passes through the cooled heat exchanger, through inlet 4b, and reaches the high-pressure tank 07.

The external solenoid valve at the bleed point can remain open indefinitely, until the air at that plant bleed point runs out, as it is not controlled by a timer. In special cases, such as cooling system initiations, the external valve may remain open for more than an hour.

What determines the end of the air collection stage at that point is the fact that there is no more air at the bleed point to be withdrawn. The system realizes this because when there is no more air in the point, the air inlet 06 starts to collect refrigerant fluid, and when it passes through the cooled heat exchanger 04, it remains in a fluid state. In this way, the high-pressure tank 07 starts to receive refrigerant fluid, causing an increase in the level of the tank. This variation is perceived by level sensor 12, and the controller closes the external valve at that point and opens an external valve at another point in the refrigeration system (plant), this being a new bleed point for the system.

Even if the new point has no air to be withdrawn, then the fluid collected will produce an immediate increase in the level of tank 07 and the controller will promptly close the valve at that new point and move to the next point. The criteria for which external valve will be opened can be fixed, such as a sweep, or any desired criteria can be logically programmed, for example, increasing the frequency of collection of points where it is known that there is a higher concentration of incondensable gases in the plant.

Figure 7:
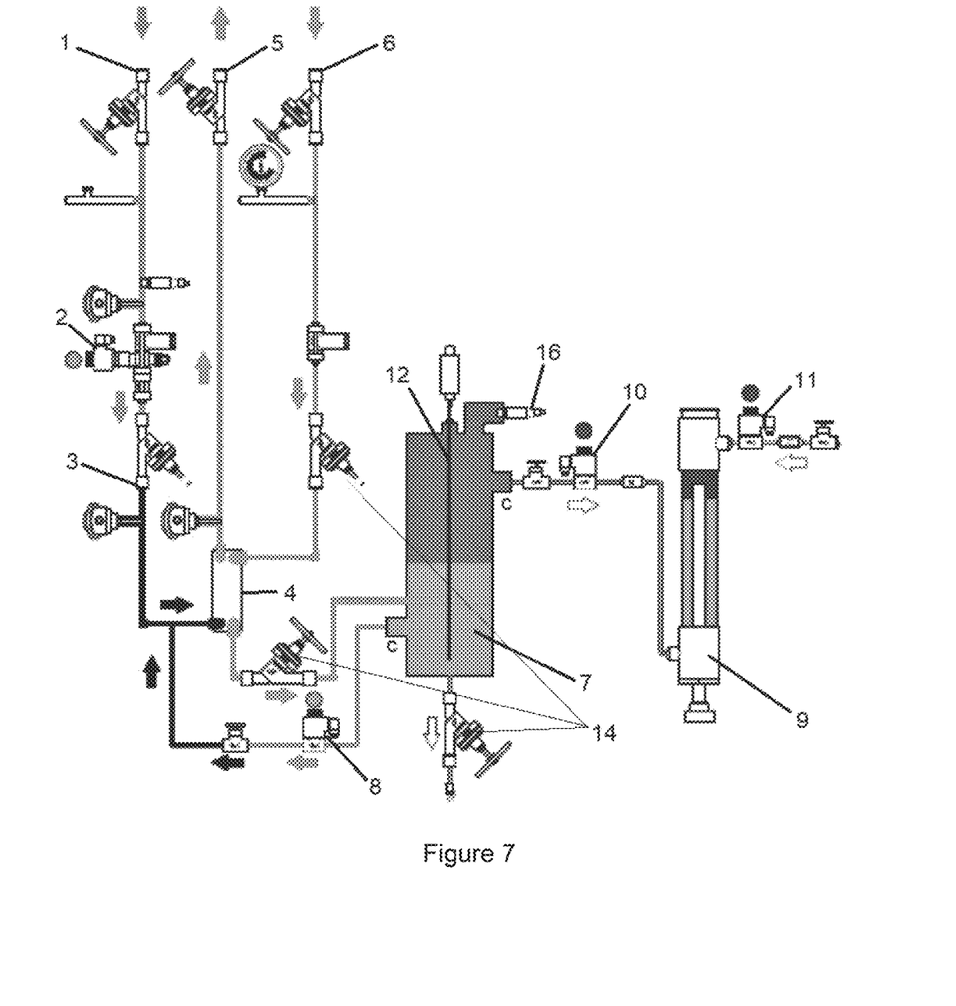
FIG. 7 represents a diagram of the flow in the pipes in system feedback operation, where the open solenoids are marked with a light dot and the closed ones with a dark dot and the filled arrows mean that there is fluid flow, while the open arrows represent that the flow is interrupted at that point.
Figure 8:
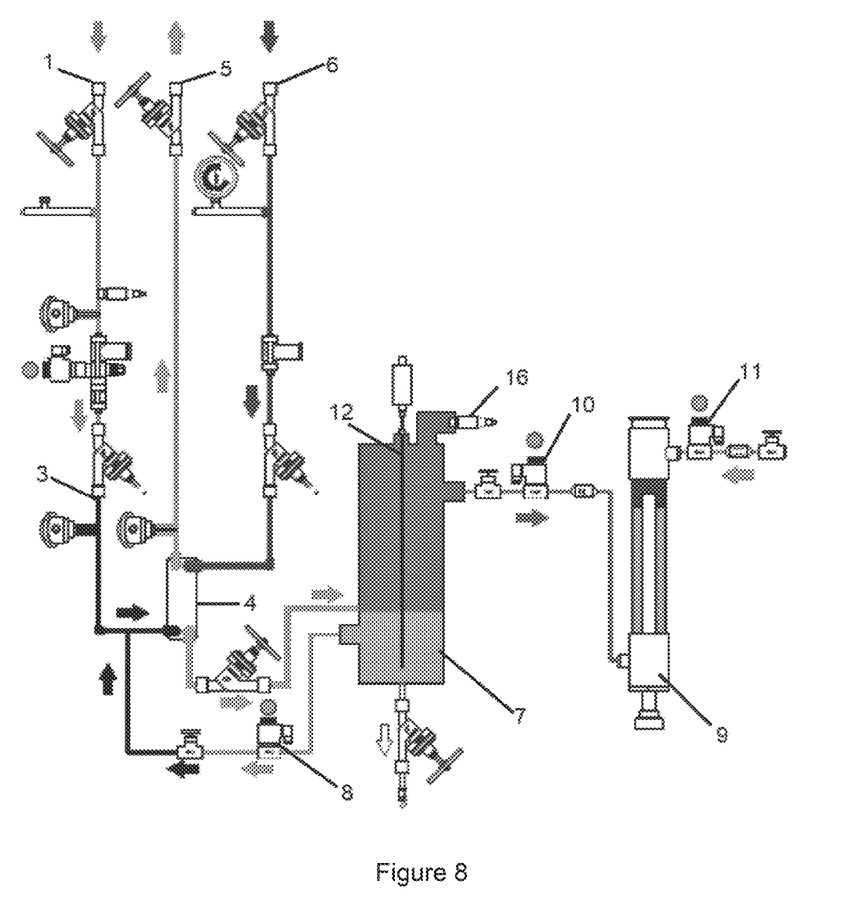
FIG. 8 represents a diagram of the flow in the pipes during air expulsion operation in the tank, where the open solenoids are marked with a light dot and the closed ones with a dark dot and the filled arrows mean that there is fluid flow, while the arrows leaks represent that the flow is interrupted at that point.

In reference to FIGS. 7 and 8, the accumulation of refrigerant fluid inside the tank 07, in fluid state, is monitored by the level sensor 12, and when the level reaches a certain level, the feedback valve 08 is actuated and the fluid from tank 07 is returned to the heat exchanger cooling system, which will return this fluid, collected together with the air and condensate, to the fluid outlet 05. Ideally, the feedback valve 08 is actuated when the level reaches between 45% and 55% of the tank 07. Therefore, the feedback outlet 07c must be positioned at a low point in the tank 07, in order to ensure that the non-condensable gases from inside the tank are not returned to the plant.

In a similar way, the concentration of collected air increases inside tank 07, so that the pressure in the tank increases. When the pressure exceeds a certain threshold, a pressure transducer 16 in the tank 07 sends a signal to the controller and the air valve 10 is opened, and the air is expelled through the air outlet 07d due to the pressure difference to the bubbler 09. Therefore, the air outlet 07d must be positioned at a high point in the tank 07, in order to ensure that only non-condensable gases from inside the tank 07 are expelled to the bubbler 09.

In addition, the bleeding system (s) contains Check Valves 15, which allow for the passage of fluids only in the right direction to the system, avoiding flows in opposite directions and possible accidents.

Additionally, refrigerant fluid is a fluid used in cooling systems, and may be ammonia, freon, halocarbons or hydrocarbons.

As a result, the system is able to recognize that the air is over and exchanged at that point. Therefore, the system has a robust control, because even if a variation occurs in the next bleed point, from the rebalancing of the pressures in the parts of the plant, the external solenoid valve will be the time that is necessary open, in contrast to the fixed time sub-time optimal of the state of the conventional art.

Thus, the external solenoid valve is open, an average of 300 to 600 seconds, which corresponds to approximately 10 to 20 times the time in timers, this is because the systems with predetermined timer are 30 to 60 seconds triggered, because the excess time is extremely disadvantageous, as the system now bleeds the refrigerant. So, the state of the conventional art solutions limit the time far below the ideal for not taking the risk of bleeding the fluid.

Therefore, there is great efficiency, and an air withdraw far greater than the equipment of the state of the conventional art. Through this air withdraw at great speed and quantity, the condensation pressure of the cooling system is quickly approaching the ideal faster, causing great energy savings and reduced time savings.

Because it is open for a large amount of time, there is no pressure accumulation at the system output, and exhaust valves 14 do not need to be triggered frequently, as these valves are used only in case of emergency, if any problem causes a problem large increase in unexpected pressure.

As a result, the air bleeding system besides being more efficient by the changer is faster in the same proportion, bringing the system the pressure of optimal condensation and avoiding overpressure that is a cause of increased energy expenditure higher than condition ideal.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. An air bleeding method for refrigeration systems, comprising:
   receiving condensed fluid coming from a refrigeration system;
   conducting the condensed fluid through a heat exchanger to cool it;
   returning the condensed fluid from the heat exchanger to the refrigeration system;
   collecting a mixture of non-condensable gases and refrigerant fluid in a gaseous state, coming from a chosen bleed point of the refrigeration system, through an opening of a first plant valve at a first point and leading the mixture to the cooled heat exchanger;
   condensing the mixture in the heat exchanger, until the refrigerant fluid remains in a fluid state at high pressure;
   conduction of the mixture of fluid refrigerant fluid and non-condensable gases at high pressure coming from the plant to a high pressure tank;
   monitoring a fluid level in the high pressure tank and a pressure in the high pressure tank;
   conduction of non-condensable gases withdrawn from the high-pressure tank to a bubbler by pressure difference through an opening of an air valve;
   conduction of bubbles and droplets of condensed refrigerant fluid from the high pressure tank to the refrigeration system by gravity, through an opening of a feedback valve; and
   expelling non-condensable gases in the bubbler;
   wherein:
   a plant valve remains open until all non-condensable gases are withdrawn from that bleed point, and when there is no more air to be bled, the system starts to receive fluid refrigerant fluid, which is conducted to the high-pressure tank, increasing the tank level;

when the pressure in the high pressure tank reaches a threshold value, an air valve is actuated and the non-condensable gases are expelled from the high pressure tank to the bubbler; and when the fluid level reaches a threshold, the first plant valve closes and a second plant valve opens, collecting air from a new point in the system and the air valve is closed and a feedback valve is actuated so that the fluid from the high pressure tank is returned to the system until the fluid level in the high pressure tank returns to an initial value.

2. The method according to claim 1, wherein the opening and closing of the valves are done automatically, following a pre-programmed logic to control the location of the system where the purge is carried out.

3. The method according to claim 1, wherein the refrigerant fluid is ammonia, freon, halocarbons or hydrocarbons.

4. The method according to claim 1, wherein the first plant valve is open from 30 seconds to 2 hours, depending only until the air ends at the point where the bleed is performed.

5. The method according to claim 1, wherein after opening the second plant valve and conveying condensed refrigerant fluid to the high pressure tank the new fluid level in the tank becomes the reference.

6. An air bleeding system, for implementing a method as described in claim 1, the system comprising:
- a fluid inlet for refrigerant fluid;
- the fluid inlet connected to a pipeline comprising a fluid line valve, followed by an expansion valve
- the expansion valve connected to an inlet of a heat exchanger;
- an outlet of the heat exchanger connected to a fluid outlet, for the refrigeration plant;
- a set of one or more external valves, located at points in the plant where non-condensable gases are to be withdrawn;
- a gas inlet;
- the air inlet connected to the inlet of the heat exchanger;
- an output of the heat exchanger connected to a high-pressure tank;
- an air outlet piping being located in an upper portion of the high pressure tank, and connected to an air valve;
- the air valve outlet connected to a bubbler;
- a feedback outlet located in a lower portion of the high pressure tank, and connected to a feedback valve;
- the feedback valve connected to a point between the expansion valve and the inlet of the heat exchanger; and
- the bubbler also connected to a water inlet valve;

wherein
the high pressure tank comprises a feedback outlet, a gas outlet and a level sensor; and
a valve control panel;
wherein when the system is actuated, the fluid line valve of the fluid inlet is opened, so that the fluid passes through the expansion valve, decreasing the pressure and temperature of the fluid to the evaporation condition, passing through the heat exchanger and cooling it, and the condensed fluid is returned to the plant through the fluid outlet and the system collects non-condensable gases through external valves, connected to desired points in the cooling system and when the external valve is opened by the controller, the air from that point is withdrawn from the plant and taken to the air inlet of the system, the non-condensable gases pass through the cooled heat exchanger, through the inlet, and reaches the high pressure tank;

wherein the external solenoid valve at the bleed point remains open, until it starts to collect refrigerant fluid from the system, so that, when passing through the heat exchanger, the refrigerant fluid collected by the external bleed valve reaches the tank, producing an increase in the tank level, and the controller senses the level variation detected by the level sensor of the tank and sends a signal to close the external valve at that bleed point, opening a new external point valve of the refrigeration plant;

wherein during the air bleed, the gas valve remains open, and the non-condensable gases are expelled through the air outlet to the bubbler, which expels the non-condensable gases to the atmosphere by pressure difference; and wherein when the fluid level in the tank reaches a threshold, the gas valve is closed and the feedback valve is activated and the liquid from the tank is returned to the heat exchanger cooling system, which will return this liquid to the plant via the fluid outlet.

7. A system according to claim 6, wherein the panel comprises a programmable logic circuit for controlling the opening and closing of the bleeding system solenoid valves and the installed external valves in the refrigeration plant, based on the reading of pressure and level sensors of the system.

8. The system according to claim 6, wherein the heat exchanger is of the parallel plate type, having a plate area between $0,3^2$ to 1 $m^2$.

9. The system according to claim 6, wherein the opening threshold of the feedback valve is between 35% and 50% of the tank level.

10. The system according to claim 6, wherein the refrigerant fluid is ammonia, freon, halocarbons or hydrocarbons.

11. The system according to claim 6, wherein the level sensor is one or more types of:
single-point level sensor and capacitive level dipstick.

12. The system according to claim 6, wherein it additionally comprises check valves in its piping, which limit the direction of circulation of fluids in the piping in a single direction.

13. The system according to claim 6, wherein it additionally comprises manually operable safety valves.

* * * * *